US006925749B2

(12) United States Patent
Wong

(10) Patent No.: US 6,925,749 B2
(45) Date of Patent: Aug. 9, 2005

(54) VEHICLE ROACH TRAP

(76) Inventor: Joe K. Wong, 1031 Nuuanu Ave., #2307, Honolulu, HI (US) 96817

( * ) Notice: Subject to any disclaimer, the term of this patent is extended or adjusted under 35 U.S.C. 154(b) by 0 days.

(21) Appl. No.: 10/679,442

(22) Filed: Oct. 7, 2003

(65) Prior Publication Data

US 2005/0072039 A1 Apr. 7, 2005

(51) Int. Cl.⁷ .............................................. A01M 1/10
(52) U.S. Cl. ............................. 43/121; 43/107; 43/122
(58) Field of Search ...................... 43/107, 114, 121, 43/122, 131

(56) References Cited

U.S. PATENT DOCUMENTS

| | | | | |
|---|---|---|---|---|
| 1,623,439 A | * | 4/1927 | Rawlings | 43/107 |
| 1,634,648 A | * | 7/1927 | Cardinet | 43/107 |
| 1,804,426 A | * | 5/1931 | Mattes | 43/131 |
| 1,867,252 A | * | 7/1932 | Crigler | 43/121 |
| 2,997,806 A | * | 8/1961 | Duvall | 43/121 |
| 3,714,733 A | * | 2/1973 | Madonna | 43/121 |
| 3,851,417 A | * | 12/1974 | Wunsche | 43/121 |
| 4,030,233 A | * | 6/1977 | Wunsche | 43/121 |
| 4,244,134 A | | 1/1981 | Otterson | |
| 4,316,344 A | * | 2/1982 | Carlsen | 43/114 |
| D269,290 S | | 6/1983 | Carlsen | |
| D275,124 S | | 8/1984 | Carlsen | |
| 4,608,774 A | * | 9/1986 | Sherman | 43/114 |
| 4,696,127 A | | 9/1987 | Dobs | |
| 4,802,302 A | | 2/1989 | Alnafissa | |
| 4,899,485 A | * | 2/1990 | Schneidmiller | 43/122 |
| 5,172,513 A | * | 12/1992 | Reibling | 43/121 |
| 5,572,825 A | | 11/1996 | Gehret | |
| 6,014,834 A | | 1/2000 | Ferland | |
| 6,112,454 A | * | 9/2000 | Plato et al. | 43/121 |
| 2002/0056223 A1 | | 5/2002 | Garretson | |
| 2003/0070348 A1 | * | 4/2003 | Spragins | 43/121 |

FOREIGN PATENT DOCUMENTS

| GB | 2 148 686 A | 4/1985 |
|---|---|---|
| GB | 2 166 034 A | 4/1986 |
| GB | 2 180 135 A | 3/1987 |

* cited by examiner

Primary Examiner—Kurt Rowan
(74) Attorney, Agent, or Firm—Richard C. Litman

(57) ABSTRACT

The vehicle roach trap is an economical and ergonomic paper or plastic cup insect trap containing a bait and which can be placed in the vehicle's cup holder(s). In a first embodiment, a paper cup trap has a lipped transparent plastic concave cover formed by an inverted dome with a small flap at its bottom that will fall open by the insect's weight. A second embodiment has a similar cover, but without the flap, and has at least a portion of the cup interior coated by a sticky, viscous substance. In the latter case, an alternative cover is substantially planar, having a plurality of concave depressions, each depression having a hole defined therein through which the roach may fall. The planar cover may also have resilient, pivotal flaps covering the holes. An adhesive sticker may be provided for sealing the hole(s) for disposal of the trap.

7 Claims, 4 Drawing Sheets

VEHICLE ROACH TRAP

BACKGROUND OF THE INVENTION

1. Field of the Invention

The present invention relates generally to insect traps. More specifically, the invention is a cockroach trap device for automobiles that fits in the vehicle's cup holder.

2. Description of the Related Art

The related art of interest describes various insect traps, but none discloses the present invention. Many people eat in their vehicles. If the vehicle interior is not cleaned and vacuumed from time to time, cockroaches may find their way into the vehicle. There is a need for an economical and ergonomic cockroach trap for placing in the cup holders of vehicles. The related art will be discussed in the order of perceived relevance to the present invention.

U.S. Pat. No. 4,316,344 issued on Feb. 23, 1982, to Carl E. Carlsen describes an enclosed and baited vessel roach trap having a lower transparent wall to the lower compartment, and an upper non-transparent wall to the lower compartment. The upper and lower compartments have funnel entrances. The trap device is distinguishable for requiring two funnel traps.

U.S. Pat. No. 4,608,774 issued on Sep. 2, 1986, to Daniel A. Sherman describes a gravity operated roach trap comprising a two-piece box configuration having an upper four-sided funnel fitting a box. The trap is distinguishable for requiring a specifically contoured four-sided funnel opening.

U.S. Pat. No. 4,696,127 issued on Sep. 29, 1987, to Nathan F. Dobbs describes a roach trap formed in the shape of a truncated pyramid having a relatively flat top surface with a concavity. A pair of parallel slits in the concavity can be pushed outward to form a convex shape to spread the slits to form an entranceway. The trap is closed by pushing the strip downward to dispose of the trapped roaches. The trap is distinguishable for require a flexible top surface which can be flexed up to open and closed by pushing down for throwing away.

U.S. Patent Application Publication No. 2002/0056223, published on May 16, 2002, describes an automatic roach trap having a disposable container therein and using a beam to detect roaches on a platform for actuating a mechanism to open in internal closure to trap the insect in the bottom container. The trap is distinguishable for requiring a radiation beam.

U.S. Design Pat. No. 269,290 issued on Jun. 7, 1983, to Carl E. Carlsen describes an ornamental roach trap comprising a transparent bottom vessel cup containing a roach trap. A concave cover has an aperture holding an opaque cup. The trap is distinguishable for requiring an ornamental opaque collection cup.

U.S. Design Pat. No. 275,124 issued on Aug. 14, 1984, to Carl E. Carlsen describes an ornamental vented floor-model roach trap comprising a transparent dome-shaped wall having vent slits on its bottom periphery on a circular base. An apparent roach-trapping strip is suspended from the circular top opening. The ornamental trap is distinguishable for requiring a dome-shaped transparent trap having perforations at its base.

U.S. Pat. No. 4,244,134 issued on Jan. 13, 1981, to Harry J. Otterson describes several structural configurations of a disposable pest trap for roaches, mice and rats comprising a first embodiment having an elongated tubular housing consisting of three parts that telescope the outer two parts over the third part which is coated with an adhesive. A second embodiment has a triangular cross-section with arcuate handgrip on top. A clip-on base section has a pest strip. A third embodiment has a house shape with a top handgrip and open ends with a coated base. The traps are distinguishable for requiring housing shapes.

U.S. Pat. No. 4,802,302 issued on Feb. 7, 1989, to Fahad A. Alnafissa describes an insect trapping pet food dish comprising a cylindrical base section supporting a concave-convex dish section that fits downward into a concave opening in the upper end of the base section. The dish section has a downwardly depending annular flange which concentrically overlies the upper cylindrical wall of the base section to produce a tortuous path for insects. Disposable adhesive strips are coated on the outer surface of the base section. The trap is distinguishable for requiring a food dish structure.

U.S. Pat. No. 5,572,825 issued on Nov. 12, 1996, to Michael J. Gehret describes a glue trap for trapping vermin such as insects, rodents, and the like. A rectangular box with top and side openings can be separated into two traps. An adhesive trap is located in a corner of a trap. The trap is distinguishable for requiring a box-type trap.

U.S. Pat. No. 6,014,834 issued on Jan. 18, 2000, to Bret Ferland describes an insect trap for attracting insects, such as roaches, formed in a square box container placed on a side and having entry ports on its rear edges. A bait insertion circular portal is located in front having elastic flaps. The bait is an insecticide gel. The trap is distinguishable for requiring a box-shaped trap with a centered entry port for adding the bait.

U.S. Patent Application Publication No. 2002/0056223, published on May 16, 2002, describes an automatic roach trap having disposable containers therein, and utilizes a battery-operated light beam interrupter device to trip a tilt platform with the insect on it. The device is distinguishable for requiring intricate tripping mechanisms.

U.K. Patent Application Publication Nos. 2,148,686, published on Jun. 5, 1985, and 2,180,135, published on Mar. 25, 1987, describe two types of cockroach traps comprising a first embodiment having an adhesive coated on the inner bottom surface of a container having sloped sides with rectangular openings and a narrow flat top with a handle. The second embodiment emphasized in the second application has an abbreviated shape with half of its housing open. The traps are distinguishable for requiring a housing or a partial housing with rectangular slot openings on their sides.

U.K. Patent Application Publication No. 2,166,034, published on Apr. 30, 1986, describes a cockroach trap comprising a black plastic molded roof, a center partition and two sidewalls formed as one part, a base provided with two strips of a sticky substance, and two end tag removers. The trap is held in place by double-sided tape. The trap is distinguishable for requiring a rectangular housing and tag removers.

None of the above inventions and patents, taken either singly or in combination, is seen to describe the instant invention as claimed. Thus a vehicle roach trap solving the aforementioned problems is desired.

SUMMARY OF THE INVENTION

The vehicle roach trap is an economical and ergonomic paper or plastic cup insect trap containing a bait, the trap being adapted for placement in vehicles and sized to fit in the vehicle's cup holder(s). In a first embodiment, a paper or plastic cup roach trap has a lipped, transparent, plastic, concave cover formed by an inverted dome with a small flap at its bottom that will fall open by the insect's weight. A second embodiment differs in having a similar cover, but without the flap, the interior of the cup being at least partially coated with a sticky or tacky substance. Alternative covers that may be used with the second embodiment include a substantially planar cover with a plurality of concavities arranged around a center concavity, wherein small flaps cover openings at the bottom of the concavities, and the same planar cover, but without the flaps. In all embodiments, a removable sticker secures the flap or opening for disposal of the trap.

Accordingly, it is a principal object of the invention to provide a roach trap for use in the cup holder of a vehicle.

It is another object of the invention to provide a roach trap comprising a paper or plastic cup having a cover having one or more concavities with bottom openings.

It is a further object of the invention to provide a roach trap having a cover having one or more concavities with bottom flap openings.

Still another object of the invention is to provide a roach trap having a sticky substance coating the inside surface of the trap.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a vehicle roach trap for trapping cockroaches and which is to be used in vehicles by being placed in the drinking cup holder(s) conventionally provided by the vehicle manufacturers.

Figure 1:
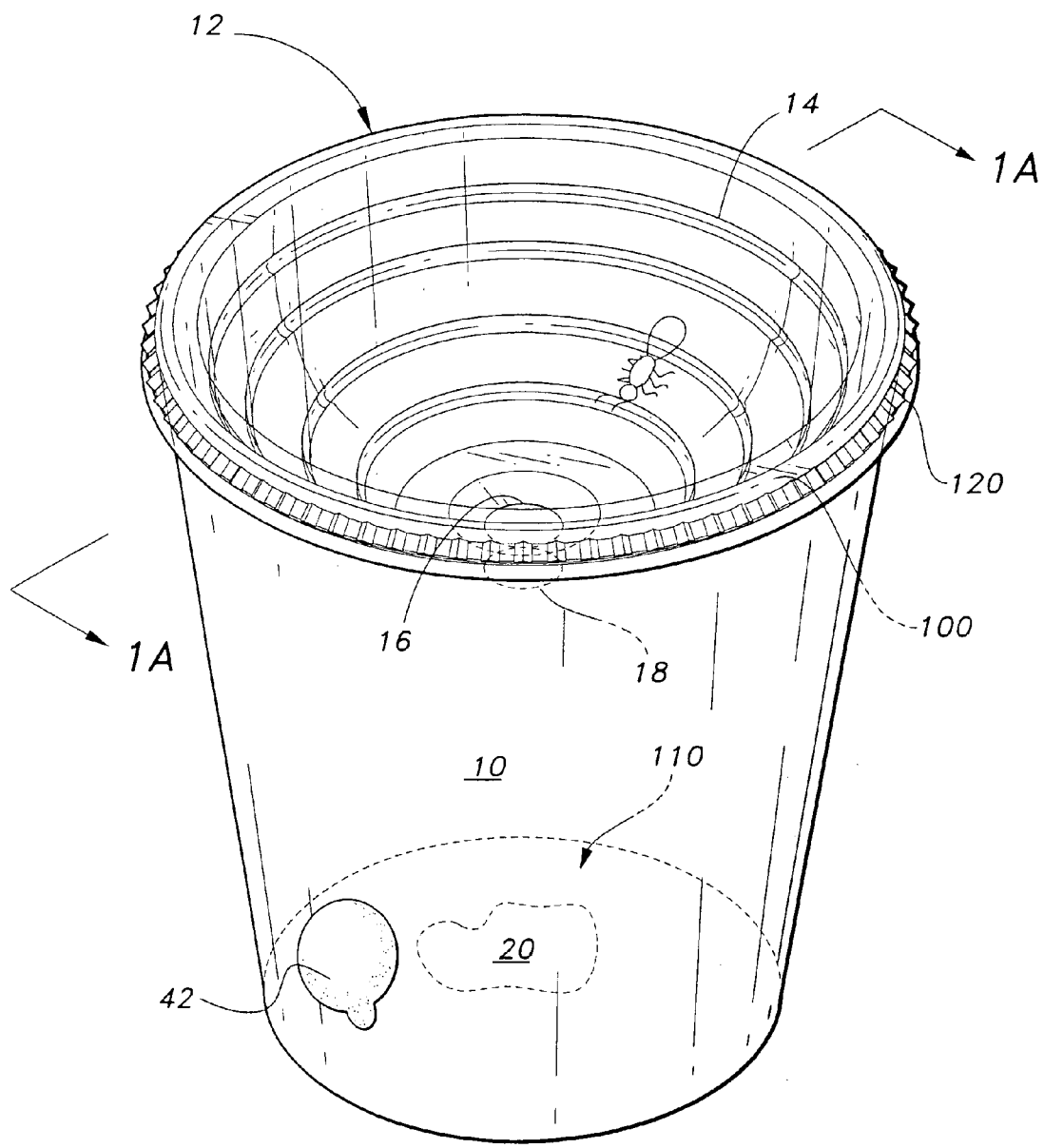
FIG. 1 is an environmental, perspective view of a first embodiment of a baited vehicle roach trap according to the present invention.
Figure 1A:
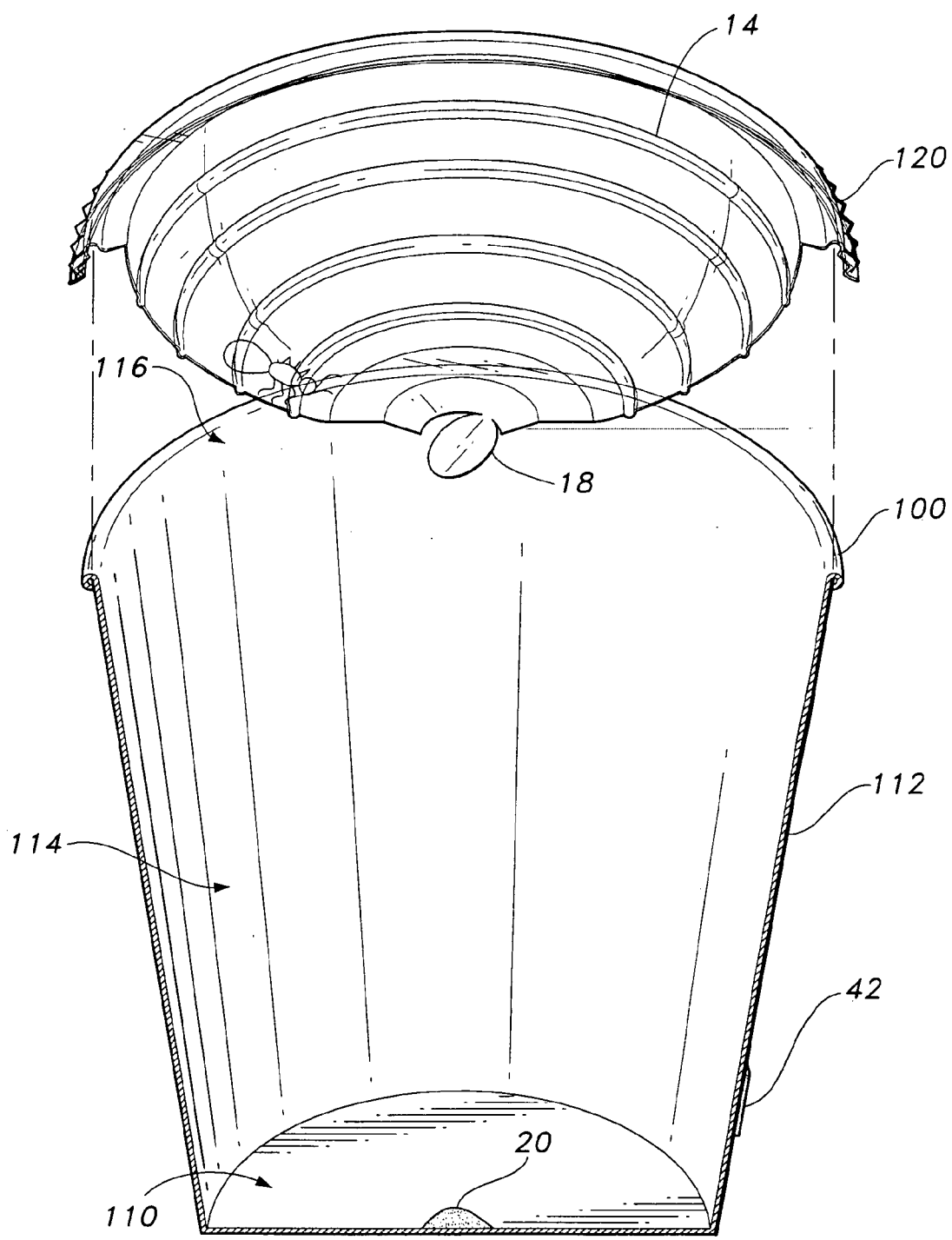
FIG. 1A is a cross-sectional view of FIG. 1 taken along 1A—1A.

The first embodiment, illustrated in FIG. 1, is a conventional cylindrical or frustro-conical waxed paper cup 10, but having a concave transparent plastic cup cover 12 formed by an inverted dome which may optionally include concentric or spiral ridges or ripples 14. As seen from the cross-sectional view shown in FIG. 1A, the cylindrical or frusto-conical cup 10 has a substantially cylindrical wall 112, a closed bottom 110, and a rim 100 surrounding and defining an open top 116. The cup 10 defines an interior volume 114. As seen in FIG. 1, the concentric circles of the inverted dome cover are stepped in sections having a different radius of curvature, in order to direct the roaches down to the bottom-positioned circular aperture 16 having a hinged flap 18 that will open with the weight of the roach (not shown) to drop the roach down to the bottom of the cup 10 where bait 20 (in dashed form) is disposed. The cover 12 includes a peripheral lip 120 (see FIG. 1A), which forms a snap fit with the rim 110 (see FIG. 1A), of the cup 10. Flap 18 may be connected to cover 12 by a living hinge, and is fairly resilient so that the flap 18 returns to its original position covering the aperture 16 after the roach falls to the bottom 110 of the cup 10. In this embodiment, the roach cannot crawl out of the trap due to the downward curve of the concave cover 12, and the flap 18 covering aperture 16.

Figure 2:
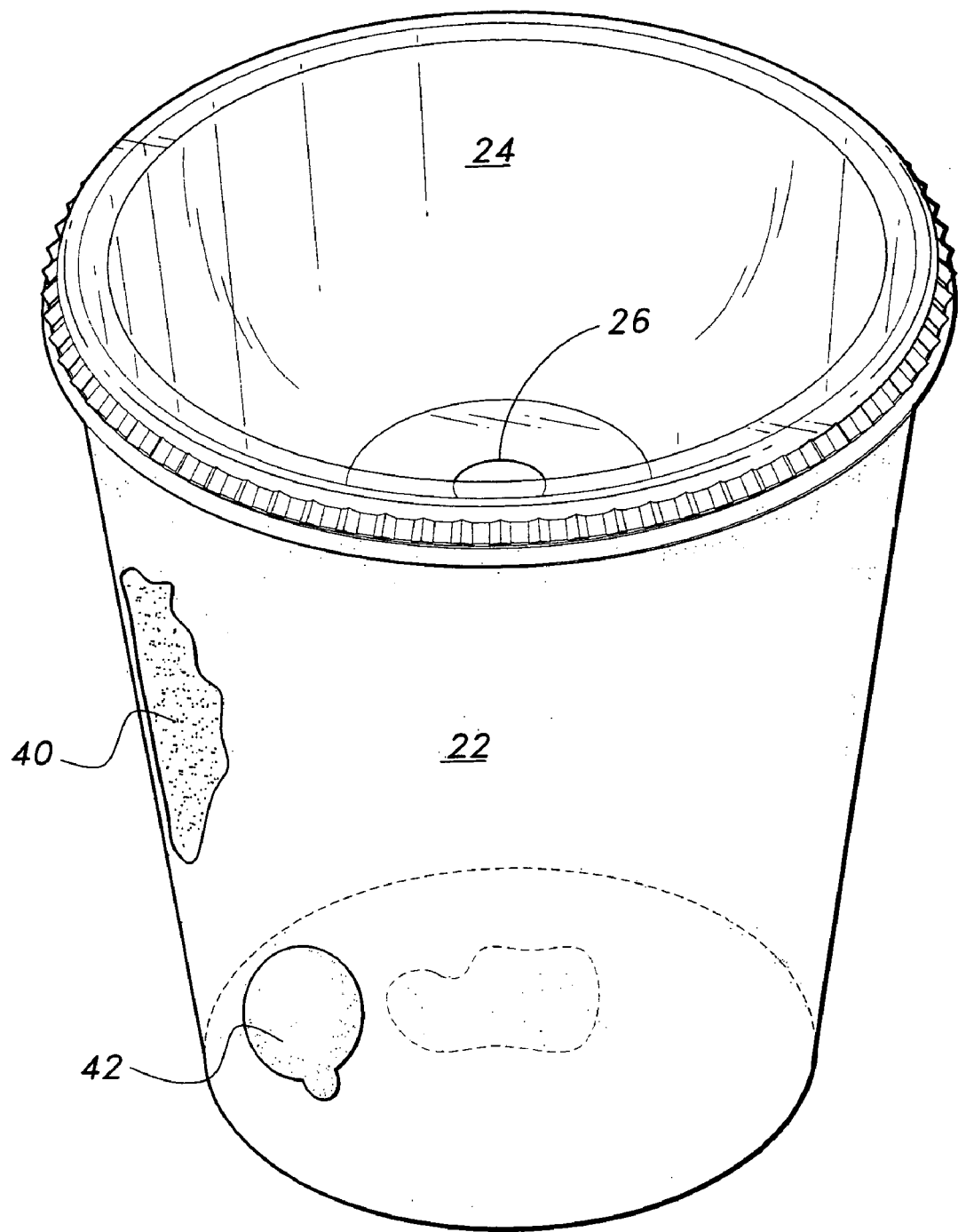
FIG. 2 is a perspective view of a second embodiment of a baited vehicle roach trap according to the present invention, partially broken away to show the interior.

In a second embodiment, depicted in FIG. 2, an unwaxed paper cup 22 has a smooth-surfaced, concave, transparent, plastic cup cover 24 formed by an inverted dome and having a circular aperture 26 without a flap for enticing the roaches to enter the cup 22 to reach the bait 20. The cover 24 includes a peripheral lip which forms a snap fit with the rim of the cup 22. Although the inverted dome cover 24 is sufficient, by itself, to prevent roaches from excaping the trap, optionally at least a portion of the interior of the cup 22 may be coated by a sticky, viscous, or tacky substance 40, such as adhesive, so that the roach cannot crawl out of the cup 22 due to the sticky substance 40 and the smooth, downward curvature of the concave cover 24.

Both cups 10 and 22 are furnished with an adhesive sticker 42 attached to the side or bottom of the cup, which may be removed and used to seal the opening 16, 26 in the cover 12 or 24 so that the roaches cannot escape the trap when the trap is disposed of. The sticker 42 may be secured to the cup 10 or 22 in the same manner as game tickets or coupons.

Figure 3:
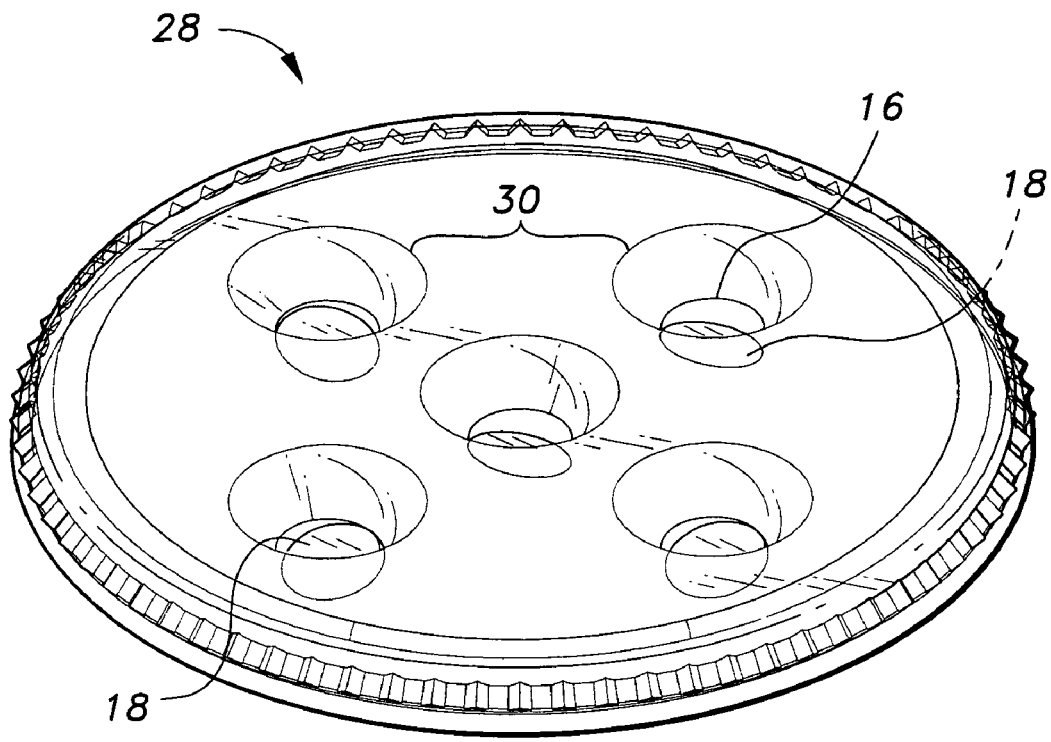
FIG. 3 is a perspective view of a third embodiment of a roach trap cover having five concavities with opening bottom flaps.
Figure 4:
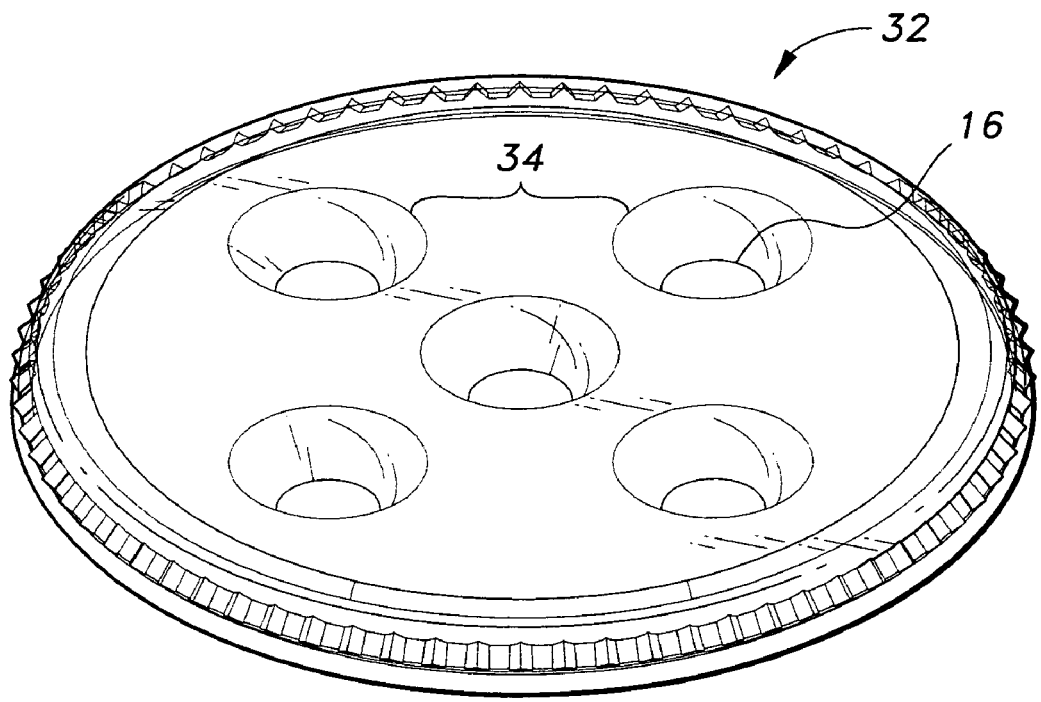
FIG. 4 is a perspective view of a fourth embodiment of a roach trap cover having five concavities with holes at their bottoms.

FIG. 3 shows a third embodiment of a transparent, substantially planar plastic cup cover 28 having a plurality of circular concave depressions or recesses 30, each having a hole 16 defined in the bottom of the depression which is covered by a hinged flap 18 as described above. The recesses 30 are arranged with four recesses 30 surrounding a centered recess 30. Cover 28 may be used in lieu of cover 24. FIG. 4 depicts another transparent, substantially planar plastic cup cover 32 having a similar arrangement of concave depressions or recesses 34, but without the flap covering the hole 16 at the base of the recess 34. Cover 32 may also be used in lieu of cover 24.

The roach trap can be baited by any food waste. Instead of paper, cups 10 and 22 may be made of plastic or styrofoam. Although particularly adapted for use in a motor vehicle, it will be obvious that the vehicle roach trap of the present invention may be used in any location capable of supporting the cup assembly.

It is to be understood that the present invention is not limited to the embodiments described above, but encompasses any and all embodiments within the scope of the following claims.

I claim:

1. A vehicle roach trap, comprising:
   a cup having a substantially cylindrical wall and a closed bottom, said substantially cylindrical wall having a rim opposite said closed bottom defining an open top, such that said cup has an interior volume, said cup being adapted for placement in a cup holder of a motor vehicle;
   a roach bait disposed inside the cup;
   a cover having a peripheral lip snapped onto the rim of the cup, the cover being in the form of an inverted dome having a plurality of concentric ripples defined therein; said cover defining a hole therein at a bottom of the inverted dome; and a removable sticker adhesively attached to said cup;

wherein said sticker is selectively positioned over the hole defined in said cover for sealing said hole;

whereby when in use, said cup is placed in a cup holder in a vehicle, said roach bait attracts roaches to enter into said cup via the hole in said cover, and upon entry, being trapped in the cup, and upon disposal, said sticker is selectively positioned to seal the hole, thereby preventing any roaches from exiting the cup.

2. The vehicle roach trap according to claim 1, wherein said cover further comprises a flap pivotally attached adjacent the hole, the flap resiliently attached to overlay the hole when closed and pivotal to uncover the hole when open.

3. The vehicle roach trap according to claim 2, wherein said cover further comprises a living hinge pivotally attaching said flap to said cover.

4. The vehicle roach trap according to claim 2, wherein said cup is made from waxed paper.

5. The vehicle roach trap according to claim 1, wherein an interior wall of said cup is at least partly coated by a sticky substance, whereby the roach is prevented from escaping by the sticky substance and the inverted dome-shaped cover.

6. The vehicle roach trap according to claim 1, wherein said cover is made from transparent plastic.

7. The vehicle roach trap according to claim 1, wherein said cup is made from plastic.

* * * * *